United States Patent [19]
Bennett

[11] 3,812,655
[45] May 28, 1974

[54] GAS-LIQUID SEPARATOR

[76] Inventor: David F. Bennett, 1100 Fleetwood Ave., Holly Hill, Fla. 32014

[22] Filed: Jan. 23, 1973

[21] Appl. No.: 326,122

[52] U.S. Cl. .................................. 55/204, 55/459
[51] Int. Cl. ........................................... B01d 45/12
[58] Field of Search ....... 55/391, 392, 396, 413, 414, 55/416, 459, 461, 462, 465, 425, 420, 450, DIG. 23, 177, 204, 205, 418, DIG. 14, DIG. 17, DIG. 22, 184, 190, 191, 192, 203, 199, 52; 210/195, 512

[56] References Cited
UNITED STATES PATENTS

| 575,561 | 1/1897 | Bingham | 55/DIG. 23 |
| 756,537 | 4/1904 | Simonds | 55/461 |
| 1,568,413 | 1/1926 | Peebles | 55/459 |
| 2,859,832 | 11/1958 | Lankenau | 55/426 |
| 3,044,236 | 7/1962 | Bearden et al. | 55/204 |
| 3,513,642 | 5/1970 | Cornett | 55/459 |
| 3,537,583 | 11/1970 | Wahner | 210/195 |

FOREIGN PATENTS OR APPLICATIONS
| 365,778 | 1/1932 | Great Britain | 55/392 |

Primary Examiner—Frank W. Lutter
Assistant Examiner—David Lacey
Attorney, Agent, or Firm—John N. Randolph

[57] ABSTRACT

A device for separating a gas from a liquid having a cylindrical receptacle, an inlet tangentially disposed there to, a centrally disposed down spout entending into said receptacle, a cylindrical baffle surrounding the upper end of said down spout and a vane positioned between the baffle and the receptacle wall for deflecting swirling liquid downwardly and away from the inlet as the liquid completes a revolution of the receptacle.

7 Claims, 3 Drawing Figures

PATENTED MAY 28 1974　　　　　　　　　　　3,812,655
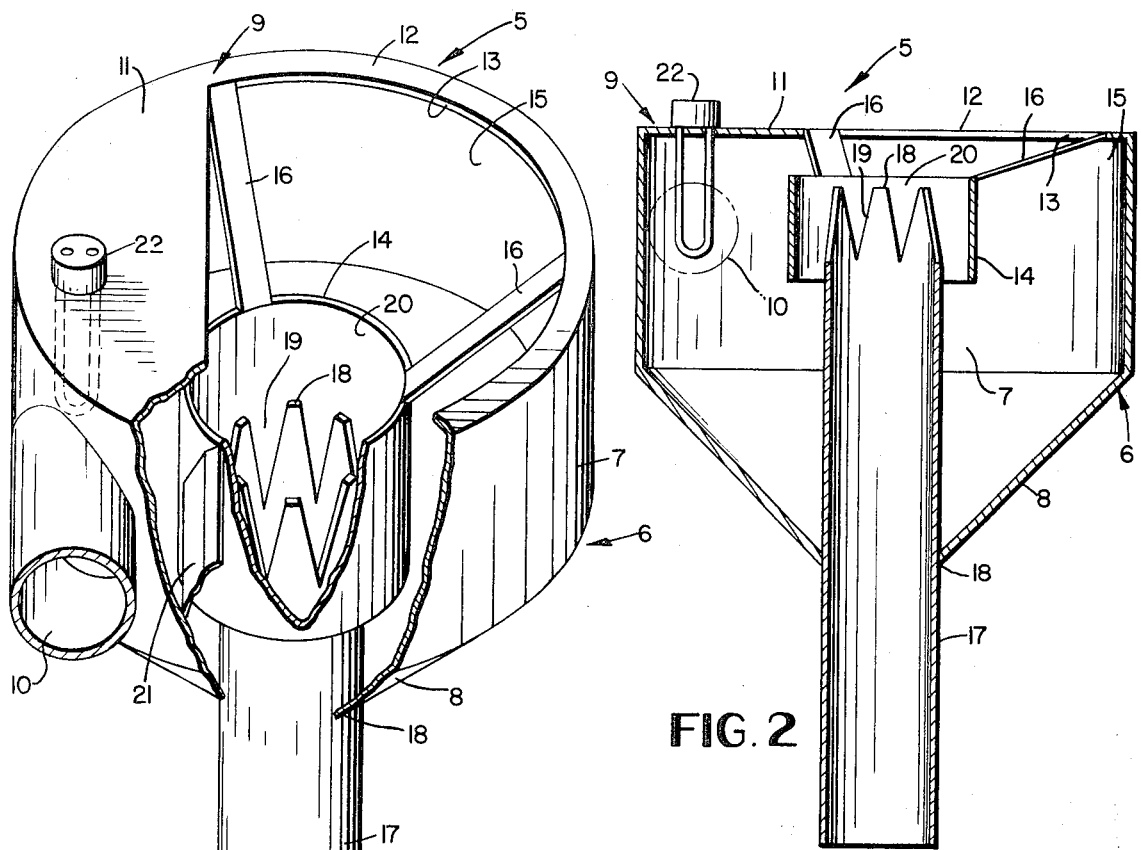
FIG. 1
FIG. 2
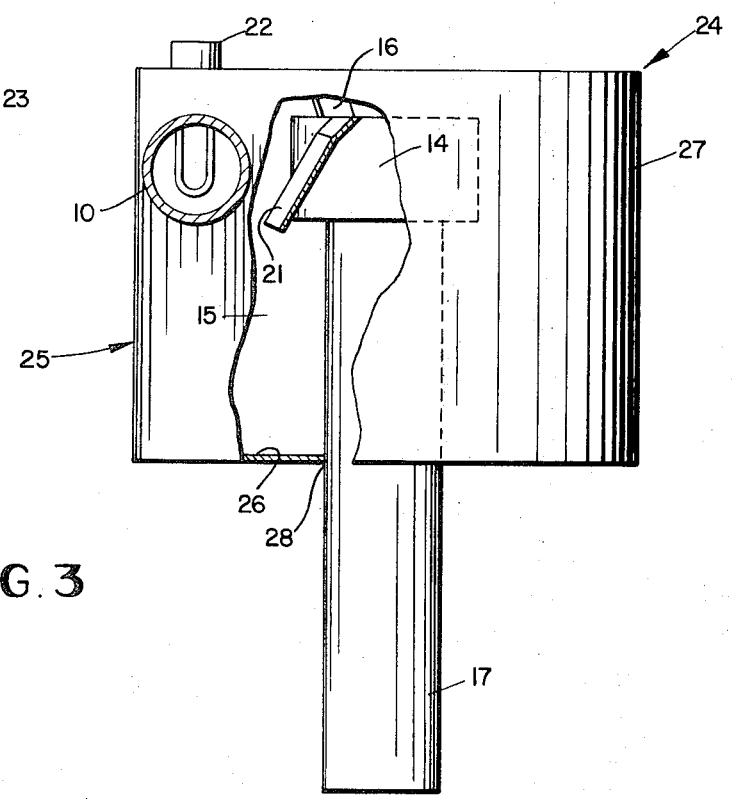
FIG. 3

GAS-LIQUID SEPARATOR

SUMMARY

It is a primary object of the present invention to provide a separator into which a gas bearing liquid is discharged under pressure in a manner to cause the mixture to move spirally within a receptacle of the separator to effect separation of the gas from the liquid by centrifugal force and by buoyancy.

Another object of the invention is to provide a separator having an opening in the top thereof for the escape of the separated gases, and means allowing the liquid to escape by gravity from the bottom of the separator and only after swirling or spiralling movement of the liquid within the separator has substantially ceased.

A further object of the invention is to provide a separator including a receptacle containing heating means for use in cold climates to maintain the contents of the separator above a freezing temperature.

Various other objects and advantages of the invention will hereinafter become more fully apparent from the following description of the drawing, illustrating presently preferred embodiments thereof, and wherein:

BRIEF DESCRIPTION OF THE DRAWING

FIG. 1 is a perspective view of one embodiment of the separator with certain of the parts broken away;

FIG. 2 is a substantially central vertical sectional view thereof, and

FIG. 3 is a side elevational view of a slightly modified embodiment of the separator.

DESCRIPTION OF THE PREFERRED EMBODIMENTS

Referring more specifically to the drawing, and first with reference to FIGS. 1 and 2, the separator as disclosed therein is designated generally 5 and includes a receptacle 6 having a cylindrical side wall 7, a frustoconical bottom 8 and a top wall 9. An inlet conduit or pipe 10 is connected to and discharges through the side wall 7 and is disposed substantially tangentially of a portion thereof. The top wall 9 includes a solid portion 11 defining a shield which is disposed over the discharge end of the inlet 10. Said top wall 9 also includes an inwardly extending rim or flange 12 which extends between end portions of the shield 11 and which combines therewith to define a relatively large opening 13 in said top wall.

An annular or cylindrical baffle 14 is supported within the chamber 15, defined by the receptacle 6, by a plurality, preferably three, braces 16 which extend between and are secured to the rim 13 and baffle 14. The braces 16 support the baffle 14 with its axis substantially coinciding with the axis of the wall 7, with its upper edge disposed slightly above the level of the uppermost part of the inlet 10, and with its bottom edge disposed slightly below the level of the bottommost portion of the inlet 10, as illustrated in FIG. 2.

An outlet conduit or down spout 17 extends through a central opening 18, defined by the restricted lower end of the bottom 8, and is secured in a liquid tight manner therein. Conduit 17 is disposed axially of the receptable 6 and has an upper inlet end 18 which is notched as seen at 19 and which is disposed within the chamber 20 defined by the baffle 14 and spaced therefrom.

A vane 21 is disposed in the chamber 15 with its inner edge secured to the baffle 14 and its outer edge extending toward wall 7. The vane 21 is spaced counterclockwise from the inlet 10, as seen in FIG. 1, in such a manner as to restrict the swirling motion and deflect the liquid downward.

An electric heating element 22 is supported by and extends downwardly through shield 11 and is disposed directly in front of the discharge end of the inlet 10 and within the chamber 15.

The separator 5 is adapted to be supported in any conventional manner, not shown, with the lower discharge end 23 disposed to open directly above or into a trough or other small container, not shown, and where it is desirable to avoid splashing. The inlet 10 is adapted to be connected to the discharge of a pump, not shown, for example, such as a conventional air lift pump. The mixture of gas and liquid is discharged from the pump under pressure through the inlet 10 into the chamber 15 where the mixture swirls in a clockwise direction, as seen in FIG. 1, around the chamber 15 for separating some of the gas or air from the liquid by centrifugal force. As the mixture and liquid approaches a complete circuit of its clockwise travel, it strikes the under or forward side of the vane 21 which is inclined, as best seen in FIG. 3, in a clockwise direction downwardly from its upper to its lower edge, so that the mixture and liquid will be deflected downwardly and under the mixture entering the chamber 15 from the inlet 10. The gas or air remaining in the mixture will escape by its buoyancy therefrom through the top wall opening 13, together with the gas previously separated by centrifugal force. The vane 21 also will check the swirling movement of the liquid, not shown, which then rises into the baffle chamber 20 and escapes from the receptacle 6 through the notched inlet or weir 18, where the liquid discharges solely by gravity through the down spout 17 with the least possible turbulence or splashing.

The heating unit 22 can be connected in a conventional manner to a source of electrical current to prevent freezing of the mixture where the separator 5 is utilized in below freezing temperatures.

FIG. 3 illustrates a slightly modified embodiment of the separator, designated generally 24, and differing from the separator 5 only in that a substantially flat bottom 26 is substituted for the frusto-conical bottom 8 of the receptacle 6. The receptacle 25 of the separator 24 may have its side wall 27 of a greater width than the side wall 7. The bottom 26 has a central opening 28 which is secured in an liquid tight manner around the down spout 17, which like the remaining parts of the separator 24 correspond with the parts of the separator 5, bearing the same reference numerals. Likewise, the operation of the separator 24 corresponds with the operation of the separator 5, as previously described.

The parts 10, 11, 21 and 22 can be disposed on the opposite side of the vertical center of the views of the drawing with part 10 extending in the same direction to cause the liquid entering the receptacle to swirl in the opposite direction or counterclockwise, with the vane 21 inclined in the opposite direction to deflect the liquid downwardly; and, various other modifications and changes are contemplated and may be resorted to, without departing from the function or scope of the invention.

I claim:

1. A gas-liquid separator comprising a receptacle having a cylindrical wall, an inlet discharging into said receptacle through a part of said cylindrical wall, the axis of said inlet being disposed substantially tangentially of the cylindrical wall to cause a gas-liquid mixture discharged under pressure into the receptacle through said inlet to move in a substantially circular path therearound, said receptacle having a top wall provided with an opening for venting gases separated from the mixture by centrifugal force and by the buoyancy of the gas, a down spout extending through and secured in the receptacle bottom, said bottom being closed around the down spout, said down spout having an upper inlet end opening within the receptacle substantially above the receptacle bottom to receive the liquid, after separation of the gases therefrom, for discharge of the liquid from the receptacle through the lower discharge end of the down spout with a minimum of turbulence and resulting splashing, an annular baffle, means supporting said baffle from the receptacle, within the receptacle and around the upper inlet end of the down spout and spaced therefrom, to permit escape of the liquid from the receptacle into the inlet end of the down spout only by an upward movement into said baffle, the upper edge of said baffle being disposed above the level of the topmost portion of the receptacle's inlet and the bottom edge of said baffle being disposed below and adjacent the level of the bottommost portion of said receptacle's inlet and substantially above the receptacle bottom, and a vane extending between a part of said beffle and a part of said cylindrical wall adjacent said receptacle's inlet and disposed to deflect the swirling mixture downwardly and away from the inlet as the mixture completes substantially a circuit of the receptacle, said vane having a bottom edge disposed substantially above the receptacle bottom.

2. A gas-liquid separator as in claim 1, said vane having a top edge and said vane being inclined from its top edge to its bottom edge in a direction such that said bottom edge is nearer the inlet discharging into said receptacle than the top edge.

3. A gas-liquid separator as in claim 1, said vane having a top edge disposed adjacent the level of the upper edge of the baffle.

4. A gas-liquid separator as in claim 1, said down spout having a notched upper end defining a weir at the inlet end thereof.

5. A gas-liquid separator as in claim 1, said top wall having a shield portion disposed over the receptacle inlet and a rim portion extending between end portions of the shield and combining therewith to confine the gas-liquid mixture within the receptacle.

6. A gas-liquid separator as in claim 1, said receptacle bottom being substantially flat.

7. A gas-liquid separator as in claim 1, said receptacle bottom being substantially frusto-conical.

* * * * *